Patented May 1, 1928.

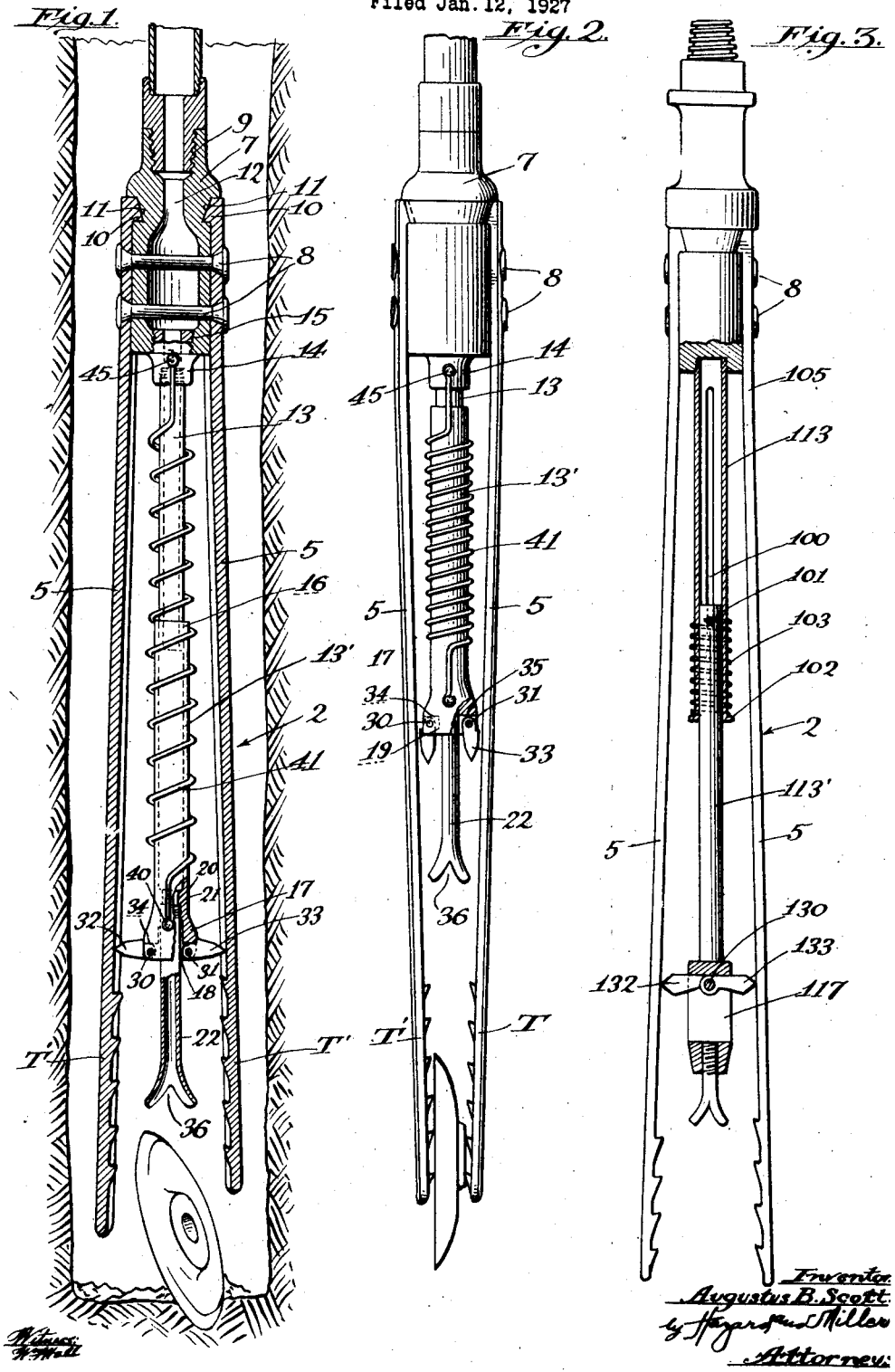

1,668,254

UNITED STATES PATENT OFFICE.

AUGUSTUS B. SCOTT, OF LONG BEACH, CALIFORNIA.

FISHING TOOL.

Application filed January 12, 1927. Serial No. 160,584.

This invention relates to fishing tools and has for an object to provide a device which can be made to take hold of drill bits, tools and other objects which may be lost in a well and lift said objects out. The drawings show two embodiments of my invention in a practical form.

Figure 1 is an elevation view showing the device lowered into a well and set for use. The object to be removed in this case, a rotary drill disc, is also shown in this figure.

Figure 2 is a similar view showing the device after the same has been tripped and has engaged the disc.

Figure 3 is a view similar to 1, showing a modified standard form of my invention. The figures are on the same scale, and like characters of reference designate like parts in all of them. The device includes a forked tool which in this instance has two depending prongs 5, and these prongs are arranged to close forcibly together at their lower ends by their own elasticity, to take a firm hold on disc 6 or other object, over which they may be slipped.

In the device which the inventor has built and used, a hollow head block 7 is provided to form the upper or crotch portion of the fork 2, and the depending prongs 5 are secured to said head block by suitable rivets 8, the upper end of the head block being provided with a screwthreaded aperture 9, whereby the same may receive the threaded connections of a drill-stem and be controlled thereby. The upper ends of the depending prongs 5 are provided with a pair of projections 10, and the head block 7 is provided with a pair of complementary recesses 11 for the reception of these projections whereby the prongs 5 are positively and rigidly secured to the head block. The head block 7 is furthermore provided with aperture 12 therethrough, said aperture being provided for a passage therethrough of liquid. The lower ends of the prongs 5 may be shaped or arranged in any manner best adapted to engage different objects in a well; and in the present instance said prongs are fitted at their lower ends with toothed jaws shown at T and T' adapted to take a biting hold on the object. The toothed jaw T' is preferably slightly longer than the jaw T, so that where the fish or object in the well is arranged at a slant as shown in Figure 1, a scooping action may take place by this jaw.

In providing releasable means for holding the prongs 5 and their jaws apart, a central guiding stem 13 depends from the head block 7, and a sleeve 14 embraces the upper end of this stem and is adapted to be threadedly screwed into the head block 7 as indicated at 15 in the drawings. An elongated tubular sleeve 13' is adapted to telescope over the stem 13 as shown at 16, and this sleeve 13' is provided as at 17 with an enlarged portion. This enlarged portion is cut away as at 18 and 19, and pivot pins 30 and 31 extend across the cut-away portion. Pivoted to the enlarged portion 17 by means of these pins 30 and 31 are a pair of pointed tongues 32 and 33 which tongues are adapted to bear against the upper shoulders 34 and 35 of the cut-away portion, when the tongues are in an extended position as shown in Figure 1. The sleeve 13' is provided at its lower end with an inside annular flange 20, providing an annular shoulder 21. A trigger member 22 has one end inserted in the sleeve 13' and this end abuts against the shoulder 21. This trigger member is in the form of an inverted Y. That is, it is provided at its lower end with a fork designated at 36, which fork is adapted to engage the fish in the well. Provided on sleeve 13' at its lower end adjacent the large portion 17 is a pin 40, which pin is adapted to anchor one end of a coil spring 41 on the sleeve member 13'. The coil spring thus anchored encircles the sleeve member 13' and the stem 13, and is anchored by a pin 45 to the sleeve 14 in the head block 7. This spring 41 in its normal position holds the elongated sleeve 13' in collapsed relation upon the stem 13. In the modification illustrated in Figure 3, I have shown my invention applied to a standard tool. The exact arrangement of parts is similar and the operation of the same is substantially identical. The stem 113 is adapted to telescope upon the elongated member 113' whereas in the rotary tool, these parts have been reversed. The stem 113 is provided with slots 100 and the elongated member 113' is provided with a pin 101, which pin is adapted to extend into the slots 100 to hold the parts in telescopic relationship. An annular flange is provided on the lower end of the stem 113. This flange is designated at 102 and the coil spring 103 instead of being anchored to the lower telescopic member, is adapted to have its lower end resting upon the flange 102.

The pin 101 is adapted to extend completely through the slots 100 and the upper end of the coil spring 103 bears against this pin. A short sleeve 117 is secured to the lower end of the elongated member 113'. The tongues 132 and 133 are pivoted to the short sleeve 117 and operate in the same manner as the tongues 32 and 33 in the rotary tool shown in Figure 1. It should be noted in this regard that the points of the tongues 132 and 133 when extended completely are on a plane slightly above the center of the pins 30, 31 and 130. This prevents the accidental setting off of the fishing tool. In the standard form of the invention the tongues 132 and 133 are pivoted at the same point 130, whereas in the rotary form there are two points of pivot. The depending prongs 105 and their manner of attachment together with the other portions of the tool are substantially the same as shown in Figure 1. In actual use my device operates as follows: The depending prongs 5 are separated by means of a specially constructed jack, and the tongues 32 and 33 assume the position shown in Figures 1 and 3. The device is then lowered into the well and when the fish is encountered by the trigger 36 the sleeve 13' is forced upwardly and at the instant the points of the tongues fall below the plane of the pivot pins 30 and 31, the jaws close upon the fish. The lower end T' of one of the prongs being slightly longer than the end T, enables a scooping action to take place on the fish. The fish is thus grasped by the teeth on the lower end of the prongs and the device is removed from the well. The action of the tool is thus shown to be instantaneous. The spring 41 draws the sleeve 13' and the operative connections associated therewith upwardly the instant that the fish is encountered.

I claim:

1. A tool including a head, a plurality of prongs depending from the head and tending to close towards a common, vertical line, a guide stem depending from the head, a sleeve slidably embracing the stem, tongues pivoted to the lower end of the sleeve, a spring anchored to said sleeve and to said stem, said spring normally tending to collapse said sleeve upon said stem, said tongues being collapsible and capable of engaging said prongs to hold the same in spaced position, shoulders on said tongues adapted to engage said sleeve when said tongues extend in opposite directions, the pressure of said prongs against said tongues serving to hold the same in stable equilibrium.

2. A device as claimed in claim 1, and in addition, a bifurcated trigger depending from said sleeve for the purpose specified.

3. A fishing tool comprising a head, a pair of prongs depending from said head, said prongs tending to assume a position adjacent each other, telescoping means secured to the head and extending downwardly between the prongs, spring means urging the telescoping means into collapsed position, and collapsible means secured to said telescoping means and serving when expanded to frictionally engage and hold said prongs separated.

4. A fishing tool comprising a head, a pair of prongs depending from said head, said prongs tending to assume a position adjacent each other, telescoping means secured to the head and extending downwardly between the prongs, spring means urging the telescoping means into collapsed position, and collapsible means secured to said telescoping means and serving when expanded to frictionally engage and hold said prongs separated, said telescoping means and head being hollow, whereby fluid can be discharged therethrough as the device is being lowered into a well.

In testimony whereof I have signed my name to this specification.

AUGUSTUS B. SCOTT.